Aug. 26, 1969    A. D. OLIVER ET AL    3,463,185
ADJUSTABLE RELIEF VALVE
Filed May 2, 1966
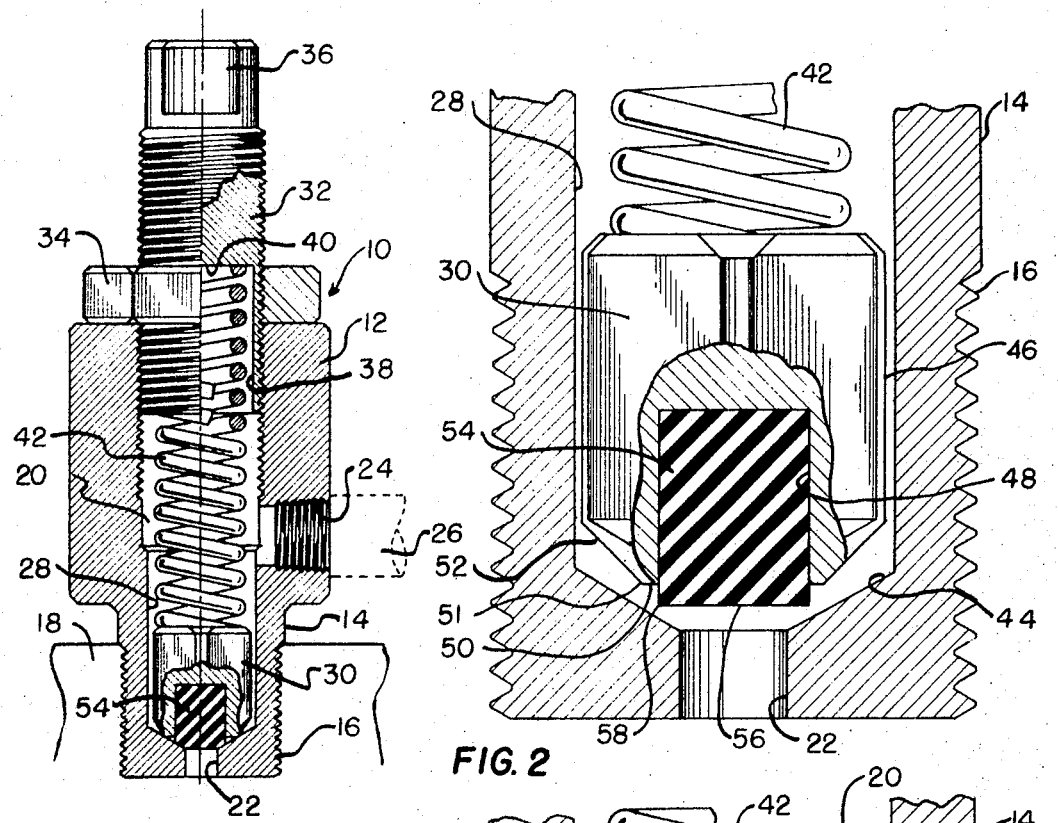
FIG. 1
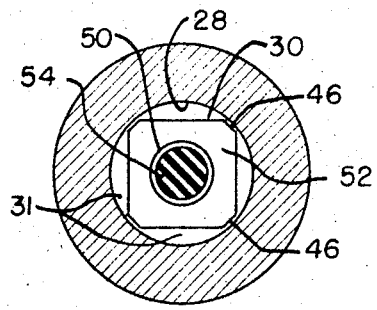
FIG. 4
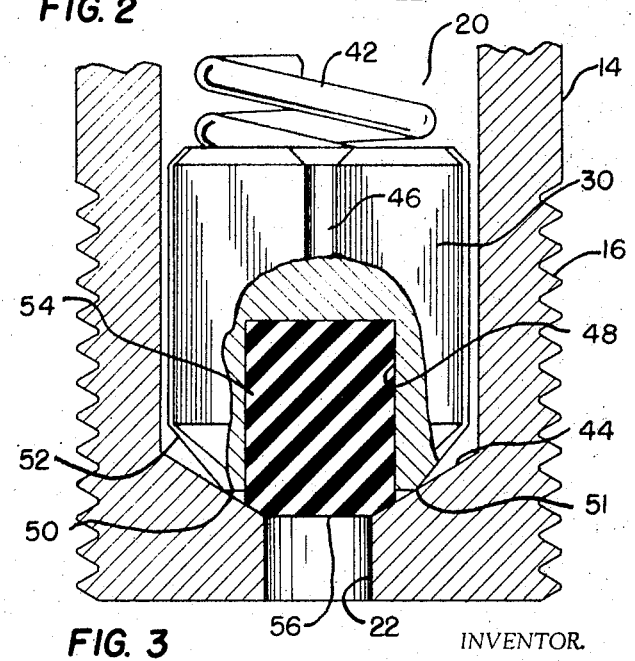
FIG. 2
FIG. 3
INVENTOR.
ALTON D. OLIVER
BY GERALD E. CARTER
*James E. Jackson*
AGENT United States Patent Office 3,463,185
Patented Aug. 26, 1969

3,463,185
ADJUSTABLE RELIEF VALVE
Alton D. Oliver and Gerald E. Carter, Houston, Tex., assignors to ACF Industries, Incorporated, New York, N.Y., a corporation of New Jersey
Filed May 2, 1966, Ser. No. 546,711
Int. Cl. F16k 17/04, 25/00
U.S. Cl. 137—516.29     3 Claims

ABSTRACT OF THE DISCLOSURE

A relief valve which comprises a valve body having a valve chamber having fluid inlet and outlet ports. A conical valve seat is formed about the inlet port and is engaged by the circular edge of a cylindrical plastic sealing member carried by a plunger to establish a fluid seal. The plunger member is provided with a square cross section which cooperates with the cylindrical interior walls of the valve body to define a plurality of flow passages through which fluid may flow past the plunger and toward the outlet. The edges of the plunger are cut away to form a plurality of small longitudinal guide surfaces which engage the cylindrical interior wall and maintain accurate alignment of the plunger. The plunger is biased toward the valve seat by a compression spring, the compression of which is adjustable by an external adjustment member. The plunger is provided with a circular edge which is disposed for contact with the valve seat for the purpose of limiting compression of the sealing member.

---

This invention generally relates to relief valves for automatic release of gaseous pressure fluid to eliminate undesirable or dangerous pressure conditions within pressure containing vessels. More specifically, the invention relates to a simple relief valve construction utilizing a resilient material for achieving a fluid tight seal to prevent the flow of fluid through the valve and having interrelated structural elements cooperating with the sealing member to prevent excessive distortion of the sealing member.

In various manufacturing processes and in the transportation control of various liquid or gaseous fluids by means of pipelines, it is quite common that pressure conditions may be extremely critical. It is frequently imperative to maintain fluid pressure below a predetermined maximum to prevent undesirable or dangerous consequences resulting from excessive pressure.

Prior to the development of this invention, a number of commercially available relief valve constructions were tested and it was determined that the wide range of variation in opening and closing pressure of these relief valve constructions rendered them virtually unacceptable for use under conditions where the maintenance of reliable and accurate relief pressure is imperative.

It was determined through laboratory tests that a primary reason for the inability of these valve constructions to maintain an acceptable narrow range of opening and closing pressure results from excessive deformation of the sealing member where resilient sealing materials are employed. Such excessive deformation is generally caused by requiring the resilient sealing member to carry the entire load applied by the compression spring. With the elastomer sealing member carrying the entire load of the compression spring, the sealing member is subject to overcompression, thereby deforming the same beyond its resilient capability and resulting in permanent deformation. After being subjected to overcompression, the sealing member, when forced away from the valve seat by the pressurized fluid in the vessel, will not return to its original configuration. Under conditions where the resilient material will not return to its original condition, the fluid pressure at which a seal will occur between the sealing member and the valve seat will differ from the original sealing pressure. This is generally referred to as operating pressure variation. The amount of operating pressure variation may become sufficiently great to exceed the critical operating pressure limits under certain applications of the relief valve structures.

When plastic materials are used as the resilient sealing material and the sealing member carries the entire load of the compression spring as indicated above, the mechanical pressure between the sealing member and the valve seat tend over long periods of time to make the sealing material flow and take a set causing a permanent change in the shape of the sealing surface thereof. Permanent pressure deformation of the sealing member, generally known in the industry as cold flow of plastic material, also results in a change of opening and closing pressures from the original preselected operating pressure, which, depending upon the application of the relief valve structure, may exceed critical operating pressure limits.

It was also determined from tests that acceptable variations in opening and closing pressures may be achieved by forming annular areas of relatively narrow high pressure contact between the sealing member and the seat surface of the valve. Prior to the development of the instant invention, however, it was impractical to achieve small annular areas of high pressure contact between the sealing member and the valve seat since this would result in overcompression and cold flow of the sealing member as discussed above, resulting in wide operating pressure variation.

It is a primary object of this invention therefore to provide a novel fluid pressure relief valve which will accurately maintain automatic opening and closing pressure thereof within an extremely narrow operating pressure variation range over long periods of time.

It is a further object of this invention to provide a novel relief valve construction which effectively utilizes elastomeric or plastic sealing materials and achieves small annular areas of high compression seal between the sealing member and the valve seat about the inlet port of the valve, and, yet is constructed to prevent overcompression and cold flow of the sealing material from which the sealing element is composed.

It is an even further object of this invention to provide a novel relief valve construction which is inexpensive in manufacture and reliable in use.

Briefly the invention is directed to a relief valve construction defining a valve chamber and having a plunger member disposed for reciprocation within the valve chamber. The plunger member carries a sealing member formed of elastomeric or plastic material and defines a generally circular edge which is urged into sealing contact with a generally frusto-conical valve seat by a compression spring. The plunger construction and the valve seat arrangement are interrelated to provide contact therebetween in the sealing position of the relief valve to limit deformation of the sealing member. The arrangement of the plunger, sealing member and valve seat is such that a small annular area of high pressure sealing contact is developed between the sealing member and the valve seat and the resilient material of sealing member is maintained within its elastic limits by the interrelated structure of the plunger and valve seat. The arrangement is such that adequate sealing pressure is readily developed, but excessive compression of the sealing material is effectively prevented.

Other and further objects of this invention will become obvious upon an understanding of the illustrative embodiment about to be described or will be indicated in the appended claims, and various advantages not referred to herein occur to one skilled in the art upon employment of the invention in practice. A preferred embodiment of the invention has been chosen for purpose of illustration and description and is shown in the accompanying drawings forming a part of the specification wherein:

FIGURE 1 is a sectional view of a relief valve construction embodying the present invention;

FIGURE 2 is a fragmentary sectional view of the relief valve construction of FIGURE 1 illustrating the plunger and sealing member in the open position thereof;

FIGURE 3 is a fragmentary sectional view of the relief valve construction of FIGURE 2 illustrating the plunger and sealing member construction in the sealing position thereof;

FIGURE 4 is a transverse sectional view of the invention showing a bottom view of the plunger with the sealing member shown in section.

With reference now to the drawings for a better understanding of this invention, a relief valve construction 10 is illustrated in FIGURE 1, which includes a body portion 12 provided with a reduced diameter portion 14. The reduced diameter portion 14 is provided with threads as illustrated at 16 for threaded connection of the relief valve to the wall structure 18 of a pressure vessel partially shown in FIGURE 1. The pressure vessel might be a pipeline, valve or other pressure containing or controlling device. The valve body 12 is provided with an internal valve chamber 20 which is in fluid communication with the pressure vessel through an inlet bore 22, and is in fluid communication with the atmosphere through an exhaust port 24. An exhaust conduit 26 which is threadedly received within the exhaust port 24 may be provided to conduct exhausted fluid to the atmosphere or to a receiver or the like for the exhausted fluid. The valve chamber 20 is defined in part by a generally cylindrical guide bore 28 which is in fluid communication with the inlet port 22. A plunger member 30 of non-circular cross section is disposed within the cylindrical guide bore 28 and is adapted to control the flow of fluid through the inlet port in a manner described hereinbelow. The plunger, in its relation with the cylindrical guide bore 28, defines a plurality of bypass passages 31 as best illustrated in FIGURE 4 which conduct the exhausted fluid past the plunger.

The valve body is internally threaded at its exterior extremity and receives an externally threaded adjustment member 32 in threaded engagement therein. A lock nut 34 is received on the external threads of the adjustment member 32 and engages the outer extremity of the valve body 12 to lock the adjustment member in its preselected position. The adjustment member 32 is provided with a non-circular outer extremity 36 which is adapted to receive a wrench or the like whereby rotational movement may be manually imparted to the adjustment member 32 as desired. The inner extremity of the adjustment member is provided with a spring recess 38 defining a spring support wall 40. A compression spring 42 is disposed within the valve chamber 20 and is interposed under compression between the spring support wall 40 and the plunger member 30. The spring member 42 therefore is operative to bias the plunger member 30 toward the inlet port 22 under compression determined by adjustment or position of the adjustment member 32. Compression of the spring 42 is infinitely adjustable for selection of desired valve opening pressures as will be discussed in detail hereinbelow.

With reference now to FIGURE 2 forming an important part of this invention, a frusto-conical valve seat surface 44 is defined at the inner extremity of the valve chamber 20 and intersects the cylindrical guide bore 28 and the inlet port 22. The frusto-conical surface is disposed in concentric relationship with the bore 28 and the inlet port 22.

The plunger member 30 as illustrated in FIGURE 4 is preferably of generally rectangular cross section although other cross sectional shapes may be employed without departing from the spirit or scope of the invention. The plunger is provided with parallel guide surfaces 46 having a relatively close fit with the cylindrical surface defined by the guide bore 28. The plunger is freely movable within the guide bore and is prevented from becoming axially misaligned by the closeness of the fit between the plunger and guide bore. The guide surfaces 46 cooperate with the cylindrical surface 28 to prevent angular misalignment of the plunger member 30 within the cylindrical bore 28. The plunger member 30 is provided with an axial bore defining a seat pocket 48 opening at the inner extremity thereof. An annular substantially planar surface 50 surrounds the seat pocket 48 and defines the inner extremity of the plunger 30. A frusto-conical surface 52 is formed at the inner extremity of the plunger member 30 and intersects the guide surfaces 46 and the annular planar surface 50. The frusto-conical surface 52 defines a smaller included angle than the included angle defined by the frusto-conical seat surface 44. The frusto-conical surfaces 44 and 52 become in intimate engagement as illustrated in FIGURE 3 and cooperate in the sealing position of the plunger 30 to define a circular line of metal-to-metal contact between the plunger 30 and the seat surface 44.

A sealing member 54 which is of generally cylindrical shape, and which may be formed of elastomeric or plastic materials, is disposed within the seat pocket 48 and has a portion thereof extending outwardly of the seat pocket beyond the annular planar surface 50. The sealing member 54 is provided with a generally planar end surface 56 which is disposed generally parallel with the end surface 50 of the plunger 30 and defines a generally circular edge 58.

As illustrated in FIGURE 3, in the normal or closed position of the relief valve structure, the compression spring 42 under adjustment determined by the position of the adjustment member 32 biases the plunger 30 into engagement with the frusto-conical seat surface 44. Under this condition, an annular peripheral portion of the sealing member 54 is deformed against the sealing surface 44 establishing a fluid tight seal therewith. The amount of compression between the sealing member 54 and the frusto-conical sealing surface 44 is maintained at a level which is only sufficiently great to establish a small annular area fluid tight seal between the sealing member 54 and the frusto-conical surface 44 by metal-to-metal contact between the plunger 30 and the frusto-conical surface 44. As illustrated in FIGURE 3, the circular edge 51 defined by intersection of the planar surface 50 and the frusto-conical surface 52 of the plunger 30 in the sealing position of the plunger will move into intimate engagement with the frusto-conical surface 44. Under this condition, virtually the entire load induced to the plunger 30 by the spring 42 is transmitted through the plunger to the seat surface 44 by the metal-to-metal contact and the sealing member therefore is maintained under an unvarying predetermined compression of low magnitude. Compression of the annular edge portion of the sealing member 54, when elastomeric material is utilized as the sealing member, is maintained well below the elastic limits or elastic memory of the sealing material, therefore assuring that the sealing material will return to its original configuration upon movement of the plunger member away from the frusto-conical seat 44. The metal-to-metal contact between the plunger and seat also effectively maintains a precise annular area of contact between the sealing member 54 and the valve seat 44. This precisely controls the area of the sealing member which is acted upon by the pressurized fluid within the pressure vessel, thereby assuring the effective maintenance of opening and closing of the valve at precise pressures with a minimum of variation.

When plastic material such as polytetrafluoroethylene (sold under the registered trademark Teflon by the E. I. du Pont de Nemours and Company) is utilized as the sealing material, some permanent deformation of the sealing member is desirable. To achieve the correct amount of area contact between the sealing member and the seat, it is desirable that the sealing member have an original configuration as illustrated in FIGURE 2. When the circular edge of the sealing member is initially deformed to the conical surface configuration illustrated in FIGURE 3, the plastic material will cold flow and take a precise permanent set. Since the amount of compression of the sealing member is limited by the metal-to-metal engagement between the plunger and seat, the inherent resilience of the sealing material will maintain a precise sealing pressure developed over the optimum sealing area of the sealing member. Subsequent operation of the valve in relieving excessive pressure from the vessel will insure intimate engagement between the sealing member and the seat under predetermined pressure and over a precise sealing area. This feature of the invention assures operation of the relief valve structure within predetermined precise limits.

In deforming the circular edge 58 or corner of the sealing member 54 against the frusto-conical sealing surface 44, it is apparent in viewing FIGURE 3 that the sealing member will be deformed to the frusto-conical shape of the seat surface. In producing this deformation, a small annular area of graduated seal is established between the sealing member and sealing surface. In deforming the annular corner 58 of the sealing member 54, the seal developed between the sealing member and frusto-conical surface 44 is of quite high compression at the central portion of the seal and of relatively low compressive values at the edge portion of the seal. This, of course, is due to greater deformation of the sealing member at the central edged portion 58 against the sealing surface 44. This insures that the annular sealing area described by the sealing member at the instant of opening or closing of the valve approaches a circular line of sealing contact. This feature further insures the maintenance of opening and closing pressures within precise limits. As indicated above, opening and closing pressures of the valve will vary within the area defined by contact between the sealing member and the seat. Since there is no broad area of contact between the sealing member and the seat, but rather a virtual circular line contact therebetween, the variation of area of the sealing member which is subjected to fluid pressure within the pressure vessel is maintained at a minimum and the opening and closing pressures of the valve are accordingly maintained within precisely controlled limits.

As indicated hereinabove, the bias of the spring 42 forces the plunger 30 into metal-to-metal engagement with the surface 44. It is pointed out that at all conditions of normal operation of the relief valve construction, the plunger 30 will achieve metal-to-metal contact with the seat surface 44. For example, in an embodiment of the invention, the distance of plunger movement between the position thereof at the initial contact between the annular edge 58 of the sealing member 54 and the seat surface 44 and the position thereof a metal-to-metal contact between the edge 51 and the surface 44 will require approximately .015 inch of plunger movement. In such an embodiment of the invention, an adequate seal is developed between the sealing member and the surface 44 upon application of sufficient pressure to move the plunger member 30 .015 inch after initial seal contact has been established. This example is merely set forth for purpose of illustration, however, and is not intended as limiting in regard to the invention.

Opening and closing pressure of the relief valve structure is infinitely adjustable by rotating the adjustment member 32 and causing axial movement thereof in the selected direction by means of the threaded engagement between the adjustment member and the valve body. Compression of the sealing member 54, however, is not varied by adjusting the spring compression to vary the opening and closing pressures of the valve 10. At all operating pressures of the valve, the plunger establishes metal-to-metal contact with the valve seat and the sealing member 54 is maintained under a predetermined compression.

Assuming that the relief valve structure 10 is threaded into the wall structure 18 of the pressure vessel and that fluid pressure within the vessel rises to a pressure above the opening pressure of the relief valve 10, the fluid pressure acting through the inlet port 22 upon the sealing member 54 will move the plunger member 30 against the bias of the spring 42, thereby breaking the seal between the sealing member 54 and the seat surface 44. Pressurized fluid within the pressure vessel 18 will be relieved past the sealing member 54 and will flow past the plunger member 30 by means of the bypass passages 31 defined by the relationship of the non-circular plunger 30 with the cylindrical bore 28. The pressurized fluid will then be bled from the valve chamber 20 to the atmosphere through the exhaust port 24 either directly or by means of an exhaust conduit 26 or the like. As the pressure within the pressure vessel is reduced to a predetermined safe condition, the compression spring 42 will urge the plunger 30 into the metal-to-metal engagement with the surface 44, thereby deforming the annular edge portion of the sealing member 56 in the manner discussed hereinabove, reestablishing the fluid tight seal and ceasing the flow of fluid through the relief valve structure.

The establishment of an annular seal between the sealing member and the seat surface without excessively deforming the sealing member assures sealing and relieving actuation of the relief valve structure within extremely narrow limits of pressure range variation. Supporting the sealing member 54 against excessive deformation by the metal-to-metal contact between the plunger and the seat surface 44 assures accurate maintenance of proper opening and relieving pressure. Since the sealing member is adequately supported in its sealed position well below the elastic limits of the sealing member, there will be no tendency for the sealing material to cold flow or to be permanently deformed by being maintained for long periods of time at the normally closed position. The metal-to-metal contact between the plunger 30 and the surface 44 assures that the sealing member 54 will be subjected to a limited amount of compression which is only sufficient to achieve sufficient deformation of the sealing member to assure positive seal.

In view of the foregoing, it is apparent that we have produced a novel relief valve construction which accurately maintains opening and relieving pressures within extremely close limits over long periods of time. The invention eliminates the possibility of cold flow or permanent deformation of the sealing member by limiting the amount of compression of the sealing member to a magnitude below its elastic limits. Due to the novel relationship of parts, an extremely small annular high compression seal is developed to provide a positive fluid tight seal between the sealing member and the valve seat under all conditions of valve operation. This novel construction assures positive maintenance of precise opening and closing pressures. Because of the simplicity of the invention, we have provided a construction which is extremely reliable in operation, yet inexpensive in manufacture. The invention therefore is one well adapted to attain all of the objects hereinabove set forth together with other advantages which are obvious and inherent from a description of the apparatus itself.

We claim:

1. A relief valve comprising a valve body defining a valve chamber, inlet and exhaust ports formed in said valve body in communication with said valve chamber, a portion of said valve chamber defining a generally tubular passage, a plunger disposed for reciprocation in said tubular passage, an adjustment screw threadedly received at one extremity of said valve body, adjustable means for locking said adjustment screw in any biasing position, a frusto-conical valve seat defined in said valve chamber about said inlet port, a compression spring interposed between said plunger and said adjustment screw and biasing said plunger into engagement with said frusto-conical seat, said plunger having a generally planar end surface, a recess formed in said end surface centrally thereof, a sealing member disposed within said recess and extending axially beyond said planar end surface, said sealing member being formed of a cold flow plastic material, which in the sealing position thereof takes a permanent set at its peripheral edge to a frusto-conical surface conforming to said valve seat to establish sealing contact therewith, said plunger in the sealing position thereof engaging said valve seat to limit deformation of said sealing member, means controlling alignment of said sealing member with said valve seat to assure positive sealing therebetween.

2. A relief valve as set forth in claim 1, said means controlling alignment comprising a plurality of elongated guide surfaces formed on said plunger, said guide surfaces being disposed in close fitting relation with the walls defining said tubular passage to maintain alignment of said plunger within said tubular passage.

3. A relief valve as set forth in claim 2, a frusto-conical surface formed on said plunger and having a lesser included angle than said frusto-conical seat, said frusto-conical plunger surface intersecting said planar end surface thereby defining a circular edge, said circular edge engaging said seat surface in the sealing position of said valve to limit deformation of said sealing member.

References Cited
UNITED STATES PATENTS

| | | | |
|---|---|---|---|
| 2,675,021 | 4/1954 | Allin | 137—516.29 X |
| 2,768,643 | 10/1956 | Acomb | 251—332 X |
| 3,071,153 | 1/1963 | Cornelius | 137—516.29 |
| 3,085,783 | 4/1963 | Pulling | 251—332 X |
| 3,200,839 | 8/1965 | Gallagher | 137—516.29 |
| 3,232,314 | 2/1966 | Koester | 137—516.29 |
| 3,255,774 | 6/1966 | Gallagher et al. | 137—516.29 |

WILLIAM F. O'DEA, Primary Examiner

D. J. ZOBKIW, Assistant Examiner

U.S. Cl. X.R.

137—543.21; 277—180